E. W. NEWMAN.
SHOCK ABSORBER.
APPLICATION FILED SEPT. 14, 1912.
1,078,060.
Patented Nov. 11, 1913.
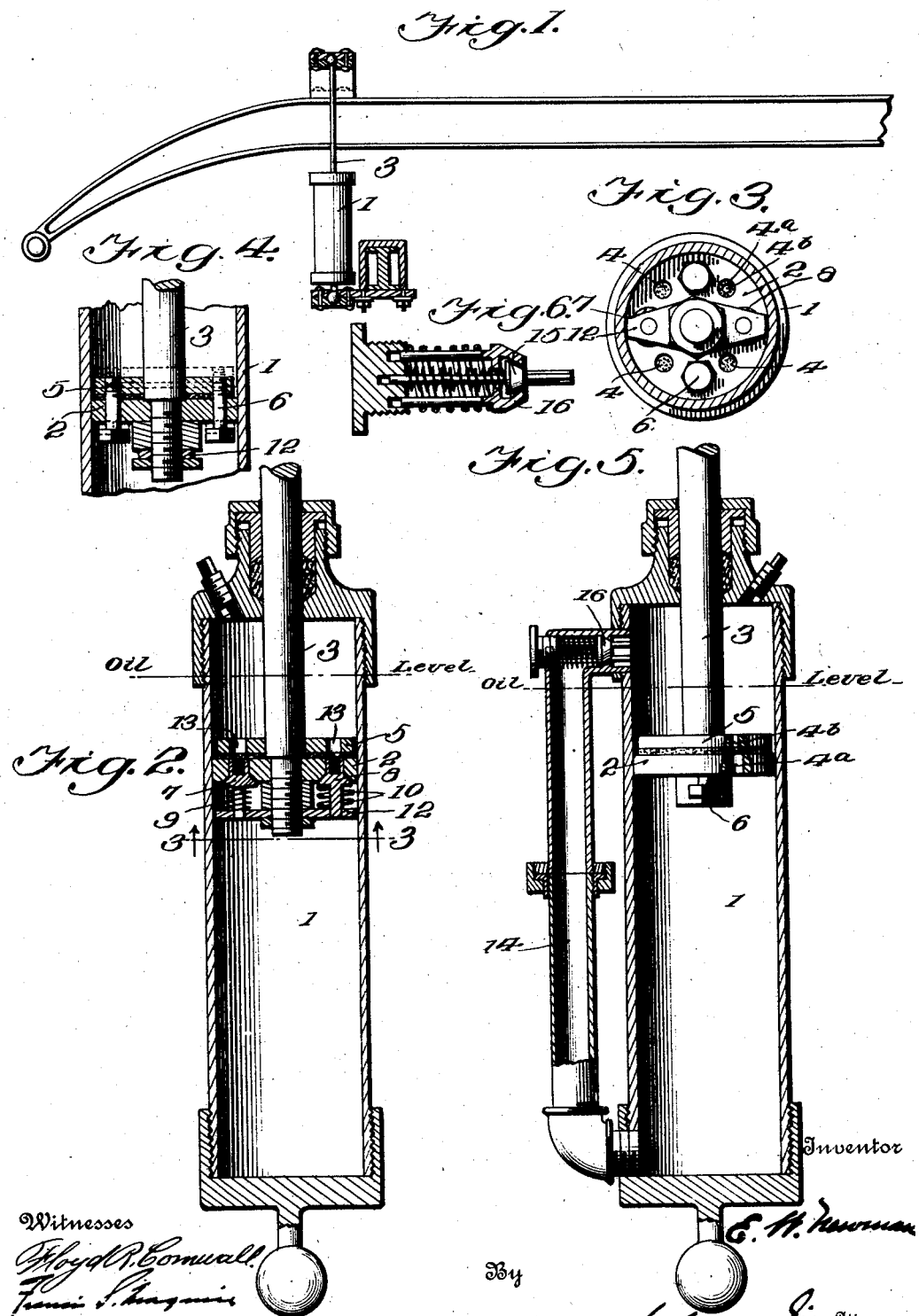

UNITED STATES PATENT OFFICE.

EDMUND W. NEWMAN, OF ASHLAND, VIRGINIA.

SHOCK-ABSORBER.

1,078,060.  Specification of Letters Patent.  Patented Nov. 11, 1913.

Application filed September 14, 1912. Serial No. 720,343.

*To all whom it may concern:*

Be it known that I, EDMUND W. NEWMAN, of Ashland, in the county of Hanover and State of Virginia, have invented certain new and useful Improvements in Shock-Absorbers; and I do hereby declare the following to be a full, clear, and exact description of the invention, such as will enable others skilled in the art to which it appertains to make and use the same.

This invention relates to the class of shock-absorbers of the dash-pot variety; and the primary object is to provide improved means for controlling the recoil, that is to say, to prevent too violent rebound of the springs; and a further object is to provide differential means for this purpose, the degree to which the passageway for the liquid is increased on the recoil being controlled by the extent to which the springs have been compressed.

In the accompanying drawings, Figure 1 shows my improved shock-absorber as applied to a chassis. Fig. 2 is a longitudinal sectional view. Fig. 3 is a section on line 3—3, Fig. 2. Fig. 4 is a slightly enlarged sectional view through the piston at right angles to the section Fig. 2. Fig. 5 shows a slight modification.

Referring to the drawings, 1 designates a cylinder which is designed to contain oil or other liquid and which is attached, preferably at its lower end, to the axle or lower half of the spring.

2 is a piston within the cylinder; and 3 the piston rod which is shown as connected to the spring or a spring-supported portion of the vehicle, said rod being extended outwardly through a stuffing-box in the top of the cylinder. The piston 2 has a series of ports 4 through which liquid passes when there is a relative movement downward of the piston, but when the piston moves upwardly these ports are closed by a disk-valve 5 which has a limited sliding movement relatively to the piston, to which latter it is connected by bolts 6. This valve is of less diameter than the bore of the cylinder so that when the piston is moving downwardly and the valve is unseated, the liquid passing upwardly through the ports may find ready outlet at the periphery of the valve. One port, 4ª, of the piston is coincident with a similar port, 4ᵇ, of the valve, to allow of a slight movement of the piston without resistance.

According to my invention the passage of the liquid from one side of the piston to the other, on the recoil, is controlled by valve-mechanism preferably consisting of two valves held to their seats by springs of different tensions, so that on slight jars the passage of the liquid will be less than when greater compression occurs. In Fig. 2 I have shown the piston as having a second set of ports which are controlled by two spring-held valves 7 and 8, the springs being of different tensions. These valves are intended to be seated when the piston is moving downwardly, under the compression of the vehicle springs, but one or both of the valves will be unseated on the recoil, that is, as the piston moves upwardly, thereby preventing violent or too sudden rebound. I have shown these two valves as being diametrically opposite, and the valve 7 as having a light spring 9, and the valve 8 a heavy spring 10, both springs bearing against a cross-plate 12 carried by the piston rod. The valve 5 has openings 13 in line with the ports controlled by the spring-held valves.

It will be understood, of course, that changes may be made in the construction and arrangement of parts without departing from the spirit of my invention. For instance, as shown in Fig. 5, instead of locating the valves in the piston they may be mounted in a by-pass 14 connecting the upper and lower portions of the cylinder. I have shown the valve arrangement in the upper end of this by-pass, and have indicated the valve 15, having a spring of lesser resistance, as mounted in the valve 16, whose spring is of greater resistance (see Fig. 6).

The advantages of my invention will be readily appreciated by those skilled in the art. It will be observed that by means of the spring-held valves there will be a gradual rebound under the recoil of the vehicle springs; and also that by having these valves under the control of springs of different tensions, under slight shocks only one valve will be unseated, whereas under more violent shocks both valves will be simultaneously unseated.

I claim as my invention:

1. In a shock absorber, the combination with a liquid-containing cylinder, of a piston therein, said piston having a plurality of ports and valve mechanism for closing said ports when the piston is moved relatively upward, a valve-controlled passage between opposite sides of said piston, and valve mechanism for controlling said passage comprising valves and springs of different tensions for holding said valves to their respective seats.

2. In a shock absorber, the combination with a liquid-containing cylinder, of a piston in said cylinder having a plurality of ports through which liquid is designed to pass when there is a relative movement in one direction between the piston and the cylinder, a valve for closing such ports when said parts are moved in the opposite direction, a plurality of valves carried by said piston for closing ports therein during the first mentioned movement, and springs varying in tension for holding said valves to their seats, one or all of said valves being unseated during said opposite movement.

3. In a shock absorber, the combination with a liquid-containing cylinder, of a piston therein, said piston having a plurality of ports for the passage of liquid when the piston is moved downward, said piston also having ports which are closed during such downward movement, valve-mechanism for closing the first mentioned ports when the piston is moved upwardly, valves carried by said piston for so closing said second ports, and springs differing in tension for normally holding said valves to their seats.

4. In a shock absorber, the combination with a liquid-containing cylinder, of a piston therein, said piston having a plurality of ports for the passage of liquid when the piston is moved downward, said piston also having ports which are closed during such downward movement, a valve for closing the first mentioned ports during the upward movement of the piston, said valve having openings coincident with the second mentioned ports, and spring-held valves normally closing the second mentioned ports and designed to be unseated only when the piston is moved upwardly.

In testimony whereof, I have signed this specification in the presence of two subscribing witnesses.

EDMUND W. NEWMAN.

Witnesses:
 FRANK H. COX,
 S. J. DOSWELL.